Oct. 16, 1962    R. WEISS    3,058,667
UNIVERSALLY SWIVELABLE SPRAYING DEVICE
Filed Feb. 15, 1961
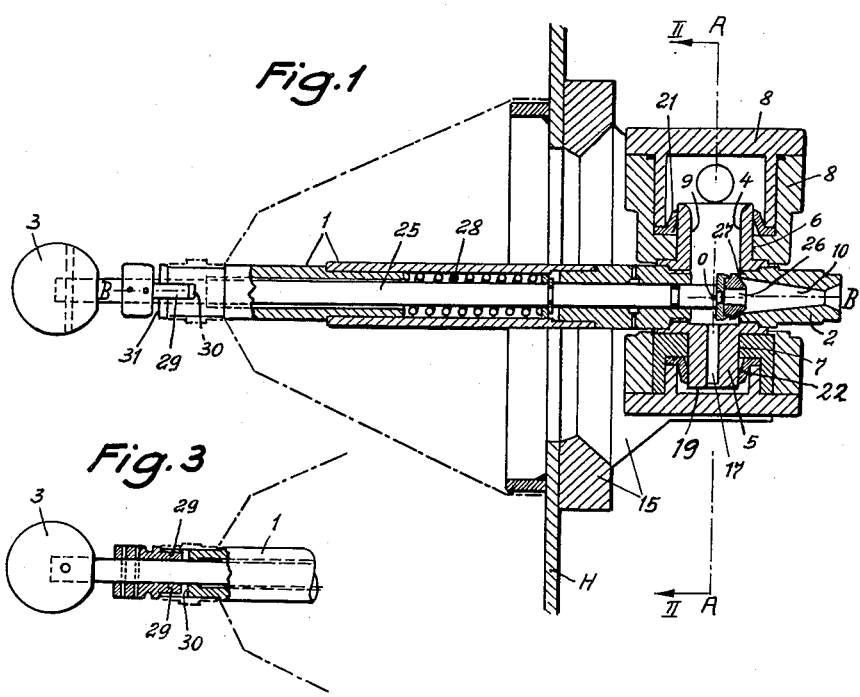
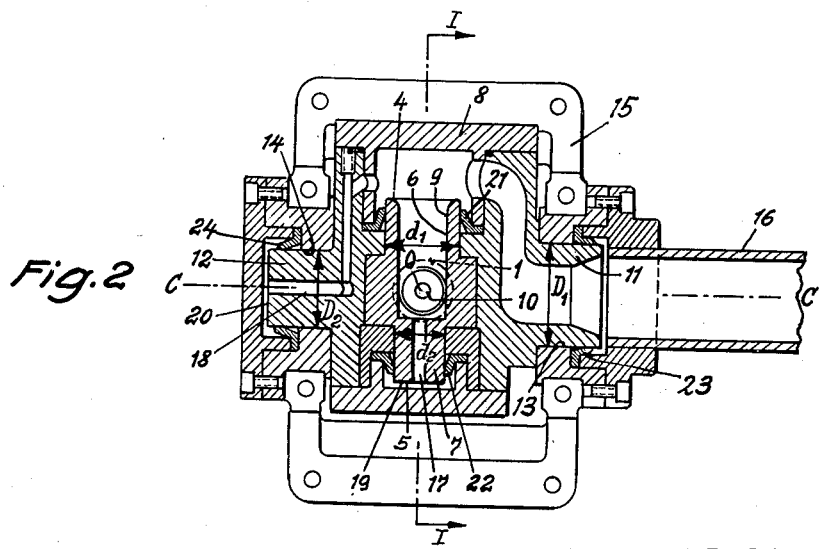
ROBERT WEISS
INVENTOR
BY *Karl F. Ross*
AGENT

United States Patent Office 3,058,667
Patented Oct. 16, 1962

3,058,667
UNIVERSALLY SWIVELABLE SPRAYING DEVICE
Robert Weiss, Winterthur, Zurich, Switzerland, assignor to A.-G. Hans Bodmer, Winterthur, Zurich, Switzerland, a corporation of Switzerland
Filed Feb. 15, 1961, Ser. No. 93,286
Claims priority, application Switzerland Feb. 19, 1960
6 Claims. (Cl. 239—227)

This invention relates to a universally or Cardanicly swivelable spraying device, in particular for use in washing machines adapted to clean engines, and parts thereof.

In Cardanicly swivelable spraying devices of the type known heretofore, the control shaft is universally supported by means of a ball or calotte within a socket.

In contradistinction to these known spraying devices, the one according to the invention is characterized in that the tubular control shaft, having at its forward end the spray nozzle and at the rear end a handle, is provided with two coaxial joint pins whose common axis intersects at right angles the longitudinal axis of the control shaft, these pins being pivoted in drilled bearings in a swivelable casing and provided with a bore which communicates with the bore of the spray nozzle; the casing is fitted on two opposite sides with respective bearing pins or gudgeons which are coaxial to each other and whose common axis extends at right angles to the axis of the joint pins which it intersects at its intersection with the axis of the control shaft, said bearing pins being further pivoted in the bores of a support stationarily arranged within the hood of the washing machine, the swivelable casing communicating with both the pressure pipe for the washing or rinsing liquid and the hole in the joint pins.

Thus, according to the invention, the Cardanic suspension of the control shaft with the spray nozzle is effected through a Cardan joint whose bearings, being cylindrical throughout, can be made much more accurately and economically than ball-and-socket joints. In addition, in a device embodying the invention, the cylindrical joint pins are much more readily and reliably sealable with simpler means, say, by packing sleeves.

Preferably, both the joint pins of the control shaft and the bearing pins or gudgeons of the swivelable casing differ in their respective diameters, the joint and bearing pins being provided with throughgoing holes to allow the liquid pressure to act on both pin ends and thus to permit a partial equalization of the pressure in the pin bearings. The pressure in the pin bearings produces a certain sliding friction liable to impede swiveling of the control shaft. By suitably dimensioning the joint and bearing pins, the bearing pressure and hence the sliding friction in the bearings may be varied within wide limits, or be practically eliminated, though the latter possibility is not considered ideal, inasmuch as a certain slight frictional resistance on swiveling the control shaft and the spray nozzle can only be of advantage in that a spray direction once set may be maintained for a short or long time without the need for holding the control shaft in position by hand.

The accompanying drawing shows by way of example one preferred form of embodiment incorporating the invention. In the drawing:

FIG. 1 shows an axial section of the spraying device, taken on the line I—I of FIG. 2;

FIG. 2 is a sectional view taken on the line II—II of FIG. 1; and

FIG. 3 shows, partly in axial section, a detail visible in FIG. 1.

The illustrated embodiment of the universally swivelable spraying device according to the invention includes a control shaft 1 which is provided at one end with a spray nozzle 2 and at the other end with a handle 3. It further comprises two coaxial joint pins 4 and 5 whose common axis A—A intersects at right angles the longitudinal axis B—B of the control shaft 1. The joint pins 4, 5 are pivoted in drilled bearings 6, 7 in a swivelable casing 8 and provided with a bore 9 communicating with the bore 10 of the spray nozzle 2. The swiveling casing 8 is fitted with coaxial bearing pins or gudgeons 11, 12 mounted on opposite sides, the common axis C—C thereof extending at right angles to the axis A—A of said joint pins 4 and 5 and intersecting these in the intersection O of the axes of joint pins 4, 5 and control shaft 1. The bearing pins 11, 12 of the swivelable casing 8 are pivoted in drilled bearings 13, 14 of a supporting yoke 15 stationarily located within the hood H of the washing machine. Yoke 15 has laterally connected to it the pressure pipe 16 for the supply of washing or rinsing liquid, the swivelable casing 8 and the bores 9 and 10 communicating with the pressure pipe.

The joint pins 4, 5 of the control shaft 1 as well as the bearing pins 11, 12 of the swivelable casing 8 differ in their respective diameters $d_1$, $d_2$ and $D_1$, $D_2$. Furthermore, the joint pins 4, 5 of the control shaft 1 are sealed with respect to the drilled bearings 6, 7 of the swivelable casing 8 by means of packing sleeves 21, 22, and the bearing pins 11, 12 of the swivelable casing 8 are sealed fluid-tight with respect to the drilled bearings 13, 14 of the stationary yoke 15 by means of packing sleeves 23, 24. The joint pin 5 and the bearing pin 12, which have the lesser diameters $d_2$ and $D_2$, are respectively provided with narrow bores 17 and 18, in order to cause the liquid pressure also to act upon the pin ends 19 and 20 and thus to enable a partial pressure equalization in the pin bearings 6, 7 and 13, 14, respectively.

The bore 10 of the spray nozzle 2 is controlled by a valve cone 26 located at the forward end of a valve stem 25 which axially passes through the hollow control shaft 1. The valve 26 is pressed under spring action towards the valve seat 27 of the spray nozzle, for which purpose the valve shaft 25 is axially movable within control shaft 1 and carries a compression spring 28, whose forward end bears on a collar on the valve stem, and whose rear end is supported against a circular shoulder within the control shaft. The spring 28 tends to keep the valve cone 26 under pressure in engagement with the valve seat 27. By retracting the valve stem 25 at its handle 3, the valve 26, 27 can be opened. To enable locking of the valve in its open position, the valve stem 25 carries two indexing pins 29 which engage a transverse slot 30 in the outer end of control shaft 1 when the valve 26, 27 is closed. Upon retraction of the valve stem 25 at its handle 3, the pins 29 are shifted out of the transverse slot 30, whereupon, after turning the valve stem, the pins 29 rest against the end 31 of the control shaft 1, thus locking the valve shaft in its retracted position. By turning the valve stem 25 back, the pins 29 can again engage the slot 30 and the valve is then closed. This method of operating the valve by axial displacement and turning of the control shaft has the advantage that no special operating device is necessary, and operation of the spraying device is simpler.

When it is desired to clean a machine part or similar object, the latter is placed adjacent the hood H whereupon the shaft 1 may be manipulated to train the nozzle 2, aligned with that shaft, upon different surface portions of the object to be sprayed with treatment fluid. The admission of this fluid to nozzle 2 is controlled by the knob or handle 3 in the manner just described.

What I claim is:

1. A spraying device comprising a nozzle, a control shaft coaxial with said nozzle and rigidly joined thereto, stationary supporting means, a casing having a pair of gudgeons journaled in said supporting means, and a pair of joint pins secured to said shaft and said nozzle adjacent the junction thereof, said joint pins being journaled in said casing, said gudgeons and said joint pins having axes orthogonally intersecting each other and the common axis of said shaft and said nozzle in a single point, at least one of said gudgeons having a first axial bore opening into said casing, conduit means on said support communicating externally of said casing with said first bore, at least one of said joint pins having a second axial bore communicating with said casing and with said nozzle, thereby establishing a path for fluid from said conduit means to be discharged through said nozzle.

2. A spraying device comprising a nozzle, a control shaft coaxial with said nozzle and rigidly joined thereto, stationary supporting means, a casing having a pair of gudgeons journaled in said supporting means, a pair of joint pins secured to said shaft and said nozzle adjacent the junction thereof, said joint pins being journaled in said casing, said gudgeons and said joint pins having axes orthogonally intersecting each other and the common axis of said shaft and said nozzle in a single point, one of said gudgeons having a relatively large first axial bore opening into said casing, conduit means on said support communicating externally of said casing with said first bore, one of said joint pins having a relatively large second axial bore communicating with said casing and with said nozzle, thereby establishing a path for fluid from said conduit means to be discharged through said nozzle, the other of said gudgeons and the other of said joint pins having relatively small third and fourth axial bores, respectively, communicating with said casing.

3. A device according to claim 2 wherein said other of said gudgeons and said other of said joint pins have diameters respectively smaller than those of said one of said gudgeons and said one of said joint pins.

4. A spraying device comprising a nozzle, a control shaft coaxial with said nozzle and rigidly joined thereto, stationary supporting means, a casing having a pair of gudgeons journaled in said supporting means, a pair of joint pins secured to said shaft and said nozzle adjacent the junction thereof, said joint pins being journaled in said casing, said gudgeons and said joint pins having axes orthogonally intersecting each other and the common axis of said shaft and said nozzle in a single point, at least one of said gudgeons having a first axial bore opening into said casing, conduit means on said support communicating externally of said casing with said first bore, at least one of said joint pins having a second axial bore communicating with said casing and with said nozzle, thereby establishing a path for fluid from said conduit means to be discharged through said nozzle, and valve means in said casing for selectively closing said nozzle against said conduit means.

5. A device according to claim 4 wherein said shaft is provided on its end remote from said nozzle with handle means, further comprising a rod extending from said handle means through said shaft to said valve means for controlling the latter.

6. A device according to claim 5, further comprising spring means within said shaft biasing said rod into valve-closing position, and indexing means on said remote end of said shaft engageable by said handle means for keeping said valve open against the force of said spring means.

References Cited in the file of this patent

UNITED STATES PATENTS

| | | |
|---|---|---|
| 2,370,975 | Lapham | Mar. 6, 1945 |
| 2,943,799 | Bodmer | July 5, 1960 |

FOREIGN PATENTS

| | | |
|---|---|---|
| 564,490 | Canada | Oct. 14, 1958 |